May 8, 1934.   B. C. RICH   1,957,805
BALL JOINT FOR CONDUITS
Filed April 22, 1932   3 Sheets-Sheet 1
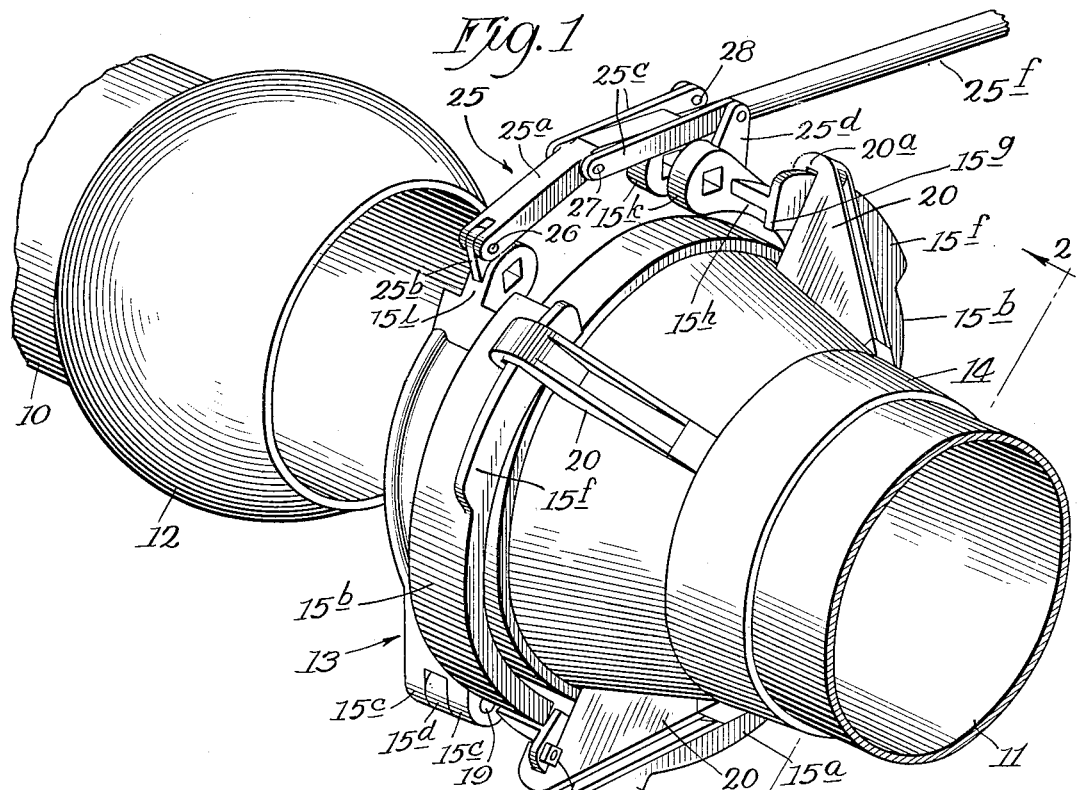
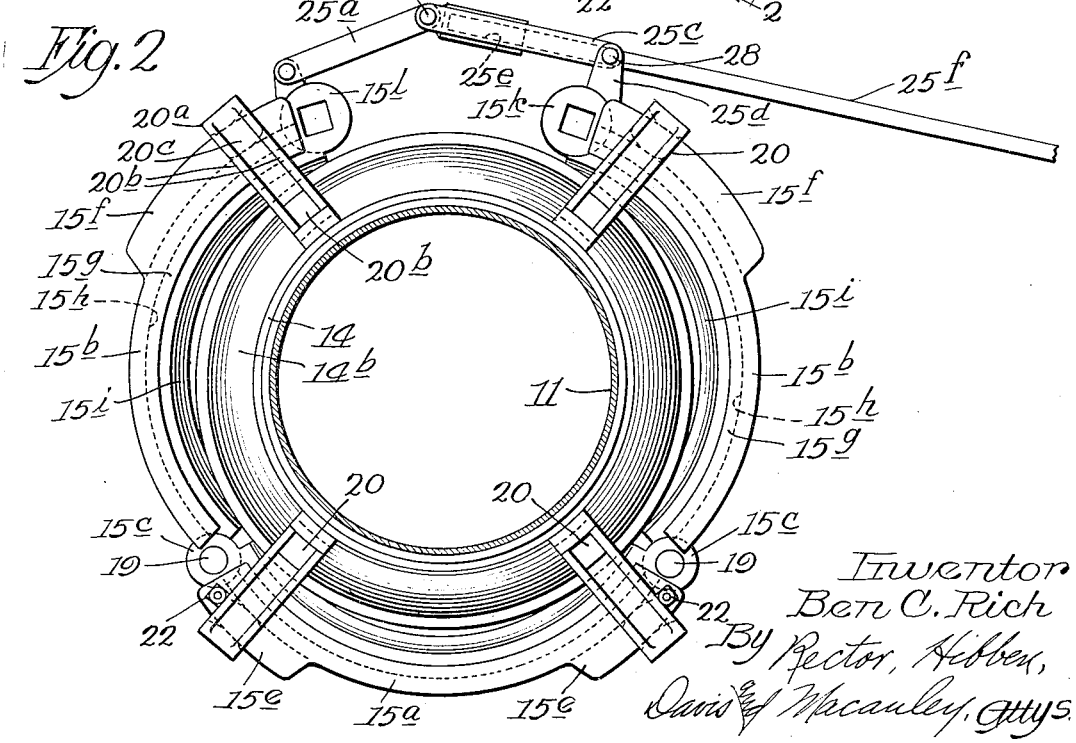
Inventor
Ben C. Rich
By Rector, Hibben,
Davis & Macauley, attys.

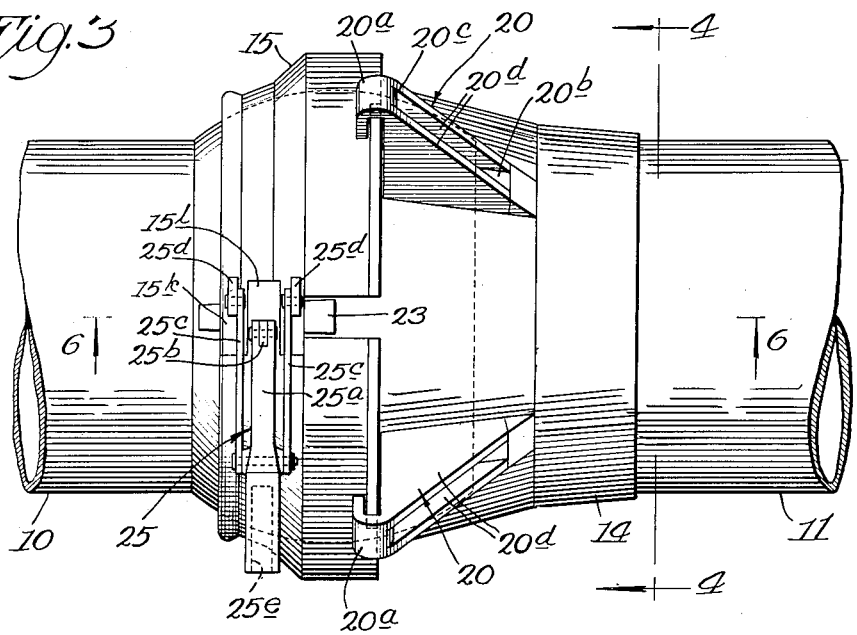
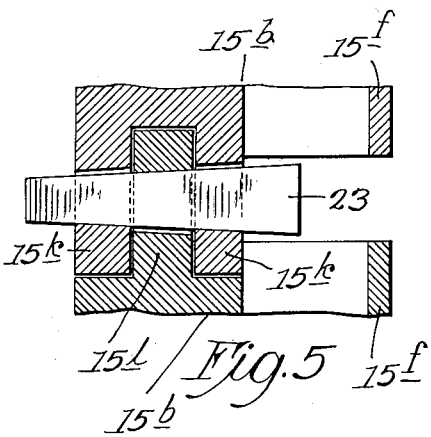

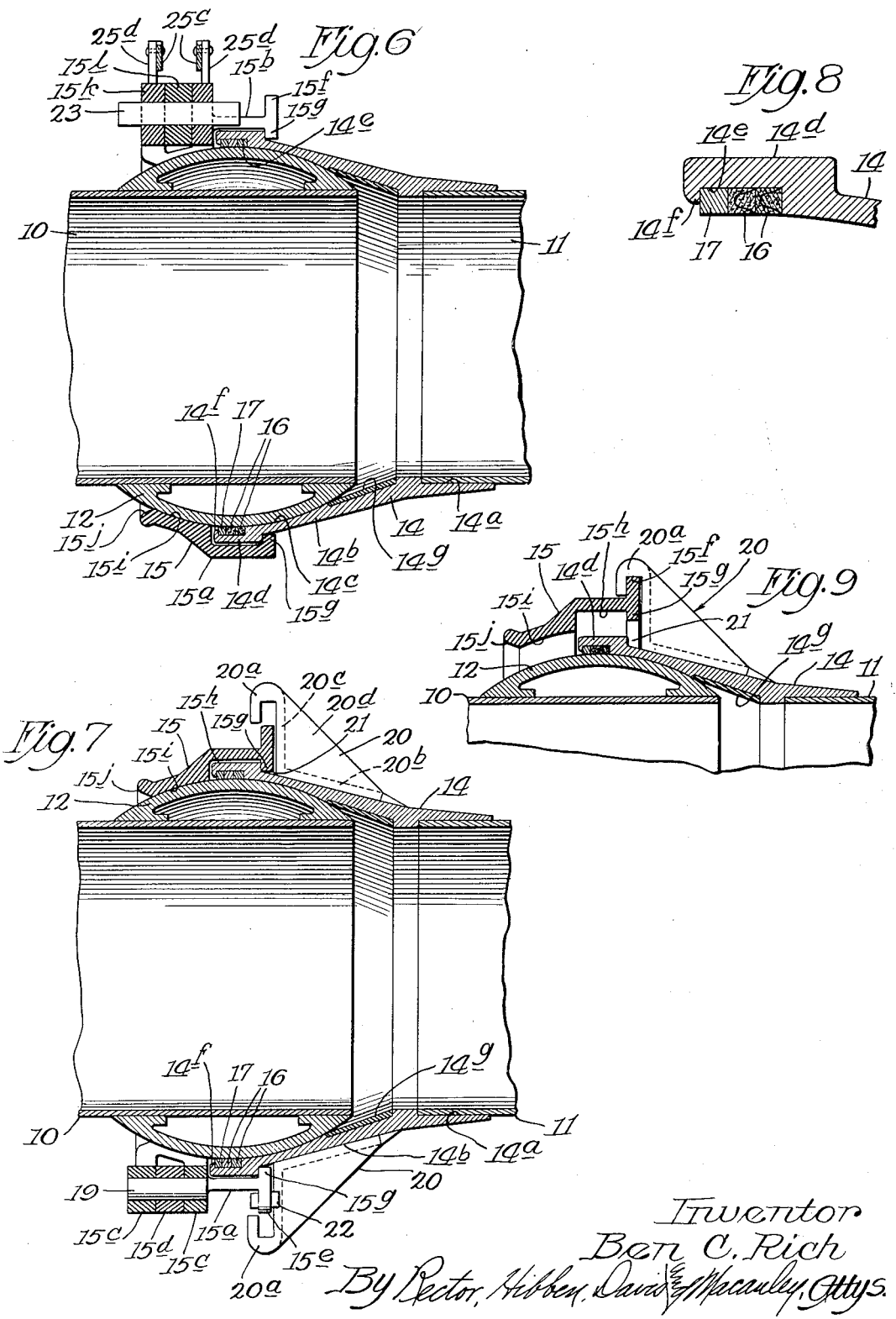

Patented May 8, 1934

1,957,805

UNITED STATES PATENT OFFICE 1,957,805

BALL JOINT FOR CONDUITS

Ben C. Rich, Winnetka, Ill., assignor to Great Lakes Dredge & Dock Company, Chicago, Ill., a corporation of New Jersey Application April 22, 1932, Serial No. 606,840

17 Claims. (Cl. 285—91)

This invention relates to improvements in ball joints for conduits and its purpose is to provide an improved joint for connecting and permitting relative universal movements of adjacent sections of conduits, such as those employed in conveying sand and sediment in suspension during dredging operations and the like. Conduits which are employed to convey the materials discharged from dredges are ordinarily relatively large in diameter and their great size and weight, as well as the necessity of changing their positions and directions frequently, makes it necessary to construct them in sections which are capable of relative movement so that the conduit may be varied in its location at any desired point in order to direct the materials at the desired angle or to the desired place of discharge. It is not only necessary to provide means for forming a substantially fluid-tight joint between adjacent sections, while permitting relative movement thereof, but also to provide a joint which will permit adjacent sections to be readily coupled together under very difficult conditions, as when the two sections are carried by adjacent scows or boats on very rough water. Heretofore, the joints which have been provided for this purpose have been made up of a number of parts which were difficult to manipulate, particularly under trying conditions, and these joints have also been lacking in strength and in the desired fluid-tight properties, so that no satisfactory joint for this purpose has been provided prior to the present invention.

The principal object of the present invention is to provide an improved ball joint for conduits which will be of simple, rugged construction comprising a minimum number of parts which may be easily and quickly manipulated to connect or disconnect adjacent conduit sections without danger to the operators or to the parts being connected. A further object of the invention is to provide a ball joint for conduits comprising parts which are adapted to have a telescoping engagement with each other and a universal movement when so engaged with a continuous bearing between the parts around the full circumference of the joint so that a tight connection is maintained. Still another object of the invention is to provide a joint in which bolts and nuts are eliminated and in which the parts are held in assembled relation by a single key which is subjected to shearing stresses only and which may be so proportioned as to yield just before the entire joint is overstrained so that it will act as a safety device for permitting the joint to open and thereby prevent damage to the entire construction. A further object of the invention is to provide a joint having an expansible part adapted to be carried by one conduit section and to receive the ball or terminal portion which is carried by the other conduit section, these parts being so formed that they may be readily brought into engagement with each other without danger to the parts of the joint or to the ends of the conduit. A further object is to provide a conduit joint comprising resilient packing rings which are easily removed and replaced and which are adapted to maintain a fluid-tight joint. Other objects relate to various features of construction and arrangement which will appear more fully hereinafter.

The nature of the invention will be understood from the following specification taken with the acompanying drawings, in which one embodiment is illustrated. In the drawings, Fig. 1 is a perspective view of the improved joint of the present invention applied to the ends of two adjacent conduit sections which are separated from each other in position to permit the ball on the end of one section to be passed into the socket of the joint which is carried by the other section;

Fig. 2 is a sectional view taken on the line 2—2 of Fig. 1, showing the gland of the joint expanded to receive the ball carried at the end of the other conduit section;

Fig. 3 shows a top plan view of the joint illustrated in Fig. 1 after the two conduit sections have been connected by the joint and the gland thereof closed to hold the parts in assembled relation;

Fig. 4 is a sectional view taken on the line 4—4 of Fig. 3;

Fig. 5 is a horizontal detail section taken on the line 5—5 of Fig. 4;

Fig. 6 is a longitudinal vertical section taken on the line 6—6 of Figs. 3 and 4;

Fig. 7 is an irregular transverse longitudinal section taken on the line 7—7 of Fig. 4;

Fig. 8 is an enlarged detail section taken radially through the outer edge of the housing, showing the packing ring; and Fig. 9 is a radial section similar to the upper part of Fig. 7 but showing the gland expanded.

As shown in the drawings, the invention is applied to two sections of conduit 10 and 11 for the purpose of connecting the ends of these conduit sections and permitting relative movement thereof. The invention comprises a so-called ball 12 which is secured to the outer surface of the end of the conduit section 10 and which is in the form of a section of a sphere adapted to permit relative rotative movement thereon of the complementary portion 13 of the joint which is carried by the other conduit section 11. The portion 13 comprises a tubular housing 14 which is counterbored as shown at $14^a$ to receive the end of the conduit section 11 which is secured thereto by spot welding or the like. From the tubular counterbored portion engaged by the section 11, the housing 14 flares outwardly as shown at $14^b$ and is provided with an internal annular surface $14^c$ in the form of a segment of a sphere of the same diameter as the spherical surface of the ball 12, so that the housing may revolve on the ball 12 while maintaining a continuous annular engagement therewith over a surface of considerable area. The flared portion of the housing 14, inwardly of the portion having the surface $14^c$, is provided with a tapered hard metal ring $14^g$ which is countersunk in a groove in the housing and which forms a liner to withstand the wear caused by the impact of sand and the like contained in the material being pumped. The housing 14 terminates in an annular rib $14^d$ provided on its inner side with an annular groove $14^e$ in which are mounted two packing rings 16 of rubber or the like which are held in place by a split metallic retaining ring 17 seated within the down-turned flange $14^f$ which forms the outer margin of the groove in the housing. These rings 16 and 17 coact with the outer surface of the ball 12 and are adapted to form a fluid-tight joint.

The housing 14 is held in place on the ball 12 by an annular gland 15 which is formed in three sections, including an intermediate section $15^a$ and two side sections $15^b$ which are hinged thereto. Each hinge comprises a pair of ears $15^c$, formed on one section, to receive between them an ear $15^d$ formed on the next adjacent section. The ears $15^c$ have secured therein a pivot pin 19 which engages the ear $15^d$ to permit relative pivotal movement of the connected sections. The section $15^a$ of the gland is provided at its inner edge with two radially extending spaced flanges $15^e$, directed transversely to the axis of the conduit, and the side sections $15^b$ of the gland are similarly provided at their inner edges with radial flanges $15^f$. These flanges $15^e$ and $15^f$ are arranged to interlock with the inturned jaws $20^a$ of guide brackets 20, four of which are secured to the outer tapered surface of the housing 14 to extend radially therefrom. Each bracket 20 comprises a plate $20^b$ secured to the housing and a radially extending part $20^c$, united to the part $20^b$ by the inclined webs or bracing walls $20^d$. The outer surfaces of the parts $20^c$ are spaced from the annular rib $14^d$ which is formed on the housing, thus leaving an annular groove 21 adapted to be engaged by an annular flange $15^g$ which forms the inner wall of an annular groove $15^h$ formed in the inner surface of the gland 15 to receive the annular rib $14^d$ of the housing. The members of the gland 15 are provided, outwardly of the annular composite groove $15^h$, with a sectional annular surface $15^i$ in the form of a section of a sphere of the same curvature as the outer surface of the ball 12 upon which this surface $15^i$ is adapted to seat. The outer edges of the sections of the gland 15 are turned radially outward, as shown at $15^j$, so that a rounded surface is presented for engagement with the surface of the ball in case the parts strike against each other during the assembly of the complementary parts of the joint.

When the sections of the expansible gland 15 are contracted to bring the curved surfaces $15^i$ into contact with the ball 12, the annular flange $15^g$ of the gland sections engages the groove 21 and coacts with the inner annular surfaces of the shoulder $14^d$ of the housing so that the parts of the gland and housing are securely interlocked with each other and embrace the curved surface of the ball 12 in such a way as to maintain the two conduit sections 10 and 11 in connection with each other and to establish a fluid-tight joint therebetween. When the gland 15 is expanded by relative movement of the sections thereof about their pivot pins 19, the flanges $15^e$ and $15^f$ move radially outward to engage the jaws $20^a$ of the guide brackets so that the gland is maintained in position on the housing, even when expanded, as shown in Figs. 1 and 2. For the purpose of preventing relative rotative movement of the gland with respect to the housing, the flanges $15^e$ of the middle section of the gland are provided with studs 22 which are adapted to engage the radial surfaces of two of the brackets 20 when the gland is expanded, as shown in Fig. 2. The gland 15 is held in its contracted condition by a connection between the free ends of the side sections $15^a$ thereof and this connection is preferably established by means of a tapered key 23 which engages correspondingly tapered apertures formed in a pair of ears $15^k$ projecting from the end of one section $15^b$ to receive between them another ear $15^l$ formed on the other section $15^b$ and provided with a similar tapered aperture, as shown particularly in Fig. 5. The key 23, having this wedging engagement with the walls of the apertures formed in the ears $15^k$ and $15^l$, serves to contract the gland 15 firmly upon the ball 12 and it will be observed that this key is subjected to shearing stresses only so that the parts are definitely held in fixed relative positions until the key fails entirely. It will be obvious that this key may be designed to fail at such a point as to permit the parts of the joint to become disassembled before any injury is done to the joint by excessive strain. The coacting surfaces of the flange $15^g$ and of the rib $14^d$ on the housing may be tapered so that when the gland 15 is contracted by driving the key 23, the wedging surfaces of the flange $15^g$ and the coacting rib $14^d$ will draw the gland 15 longitudinally of the conduit toward the housing 14, thus further increasing the grip of the gland and housing upon the ball 12.

The parts of the gland 15 may be expanded or contracted to a position where the tapered key 23 may be driven, by any suitable mechanism such as the toggle mechanism 25. This toggle mechanism comprises an intermediate lever $25^a$ pivotally connected at one end by a pin 26 to an ear $25^b$ projecting from one of the gland sections $15^d$. At an intermediate point, the lever $25^a$ is connected by a pivot pin 27 to a pair of links $25^c$ which, in turn, are pivoted at their other ends by pins 28 to ears $25^d$ which are carried by the other gland section $15^b$. The free end of the lever $25^a$ is provided with a socket $25^e$ adapted to receive an operating handle $25^f$ which may be manipulated to force the parts into the separated relationship shown in Figs. 1 and 2 or to bring them into the contracted position shown in Figs. 3 and 4. When the parts are contracted as shown in Fig. 4, the key 23 may be driven to the position shown in Figs. 3 and 5 to effect a still closer engagement of the gland and housing with the ball 12.

It will be seen that the foregoing invention provides a simple and conveniently operated joint comprising an expansible gland which may be readily moved to its expanded condition, after withdrawal of the key 23, to permit the insertion or withdrawal of the end of the conduit section 10 having the ball 12 secured thereon. When the ball has been inserted, the gland may be readily contracted by operating the handle 25$^f$ whereupon the key 23 may be driven to hold the parts in assembled relation. The expansion and contraction of the gland may thus be effected by the manipulation of a single member and the parts may be held in contracted position by the insertion of a single key. This simplicity of construction and operation permits the ends of two conduit sections to be connected or disconnected under very rough weather conditions without danger of injury to any of the parts of the joint and without danger of upsetting the edges of the conduit sections or of any other parts.

Although one form of the invention has been shown and described by way of illustration, it will be understood that it may be constructed in various other embodiments within the scope of the appended claims.

I claim:

1. The combination with a pair of conduits, of means forming an enlargement on one of said conduits, a radially expansible gland carried by the other of said sections to embrace and coact directly with said enlargement, and means for retaining said gland on said last named section when expanded.

2. The combination with a pair of conduits, of means forming an enlargement on one of said conduits, a housing carried by the other of said conduits to receive a portion of said enlargement, an expansible gland carried by said last named conduit to interlock and coact directly with the remaining portion of said enlargement, and means carried by one of said conduits for embracing the outer side of said gland and retaining it on said last named conduit when expanded.

3. The combination with a pair of conduits, of an annular spheroidal member secured on one of said conduits, a plurality of brackets carried by the other of said conduits, and an annular expansible device loosely engaging said brackets and coacting with said annular spheroidal member.

4. The combination with a pair of conduits, of an annular spheroidal member secured on one of said conduits, a housing secured on the other of said conduits and having a socket to receive a portion of said annular spheroidal member, an annular gland coacting with said spheroidal member, and brackets carried by said housing and permanently interlocking with said gland.

5. The combination with a pair of conduits, of an annular spheroidal member secured on one of said conduits, a housing carried by the other of said conduits and having a socket to receive a portion of said spheroidal member, an annular gland comprising pivotally connected sections having an internal surface coacting with another portion of said spheroidal member, and means holding said gland on said housing when said gland is expanded.

6. The combination with a pair of conduits, of an annular spheroidal member secured on one of said conduits, a housing carried by the other of said conduits and having a socket to receive a portion of said spheroidal member, an annular sectional gland having an internal surface coacting with another portion of said spheroidal member, means connecting said gland with said housing, and means for expanding and contracting said gland while maintaining a connection with said housing.

7. The combination with a pair of conduits, of an annular enlargement on one of said conduits, a housing carried by the other of said conduits to receive a portion of said enlargement, a sectional gland connected to said housing and having parts adapted to coact with another portion of said enlargement, and means comprising a tapered key for securing two adjacent sections of said gland together.

8. The combination with a pair of conduits, of an annular enlargement on one of said conduits, a housing carried by the other of said conduits to receive a portion of said enlargement, a sectional gland connected to said housing and having parts adapted to coact with another portion of said enlargement, toggle mechanism connected to two adjacent sections of said gland for contracting said gland about said enlargement, and means including a key for securing said last named sections of said gland together.

9. The combination in a coupling for connecting conduit sections, of a housing adapted to be secured to one of said sections and having a socket to receive a part carried by the other section, said housing having an annular rib, an annular expansible gland having parts adapted to interlock with said rib when said gland is contracted, said gland having an outwardly extending flange, and means carried by said housing to interlock with said flange when said gland is expanded.

10. The combination in a coupling for connecting conduit sections, of a housing adapted to be secured to one of said sections and having a socket to receive a part carried by the other section, said housing having an annular rib, an annular expansible gland having parts adapted to interlock with said rib when said gland is contracted, said gland having an outwardly extending flange, means carried by said housing to interlock with said flange when said gland is expanded, and means for limiting relative rotation of said gland and said housing.

11. The combination in a coupling for connecting conduit sections, of a housing adapted to be secured to one of said sections and having an internal annular surface forming a section of a sphere, a plurality of brackets carried by said housing, and an annular gland comprising pivotally connected sections loosely engaging said brackets and having an internal surface forming a section of a sphere, said gland being retained by said brackets when expanded.

12. The combination in a coupling for connecting conduit sections, of a housing adapted to be secured to one of said sections and having a socket to receive the end of the other section, a plurality of stationary brackets carried by said housing and having inwardly extending jaws, and a radially expansible annular gland having outwardly extending flanges adapted to be engaged by said jaws.

13. The combination in a coupling for connecting conduit sections, of a housing adapted to be secured to one of said sections and having a socket to receive the end of the other section, a plurality of brackets carried by said housing and having inwardly extending jaws, and a radially expansible annular gland having outwardly extending parts adapted to interlock with said jaws when said gland is expanded, said gland and said housing having other parts adapted to interlock when said gland is contracted.

14. The combination in a coupling for connecting conduit sections, of a housing adapted to be secured to one of said sections and having an internal annular surface forming a section of a sphere, and an annular hard metal tapered liner mounted permanently within and forming a lining for the inner tapered portion of said housing.

15. The combination in a coupling for connecting conduit sections, of a housing adapted to be secured to one of said sections, a plurality of brackets carried by said housing, a gland comprising a plurality of hinged sections having parts adapted to engage said brackets, two of said gland sections having overlapping parts provided with tapered apertures, and a tapered key engaging said apertures.

16. The combination with a pair of conduits, of an annular spheroidal member secured on one of said conduits, a housing secured on the other of said conduits and having a socket to receive a portion of said annular spheroidal member, and an annular gland comprising a plurality of connected sections adapted to be contracted around said spheroidal member, and means carried by said housing for retaining said gland sections permanently in position to embrace said spheroidal member when said sections are contracted and when said sections are expanded.

17. The combination with a pair of conduits, of an annular spheroidal member secured on one of said conduits, a housing secured on the other of said conduits and having a socket to receive a portion of said annular spheroidal member, an annular radially expansible gland adapted to embrace and coact directly with said annular spheroidal member, and a plurality of brackets stationarily mounted on said housing and having parts projecting inwardly to interlock with said gland when it is expanded.

BEN C. RICH.